UNITED STATES PATENT OFFICE.

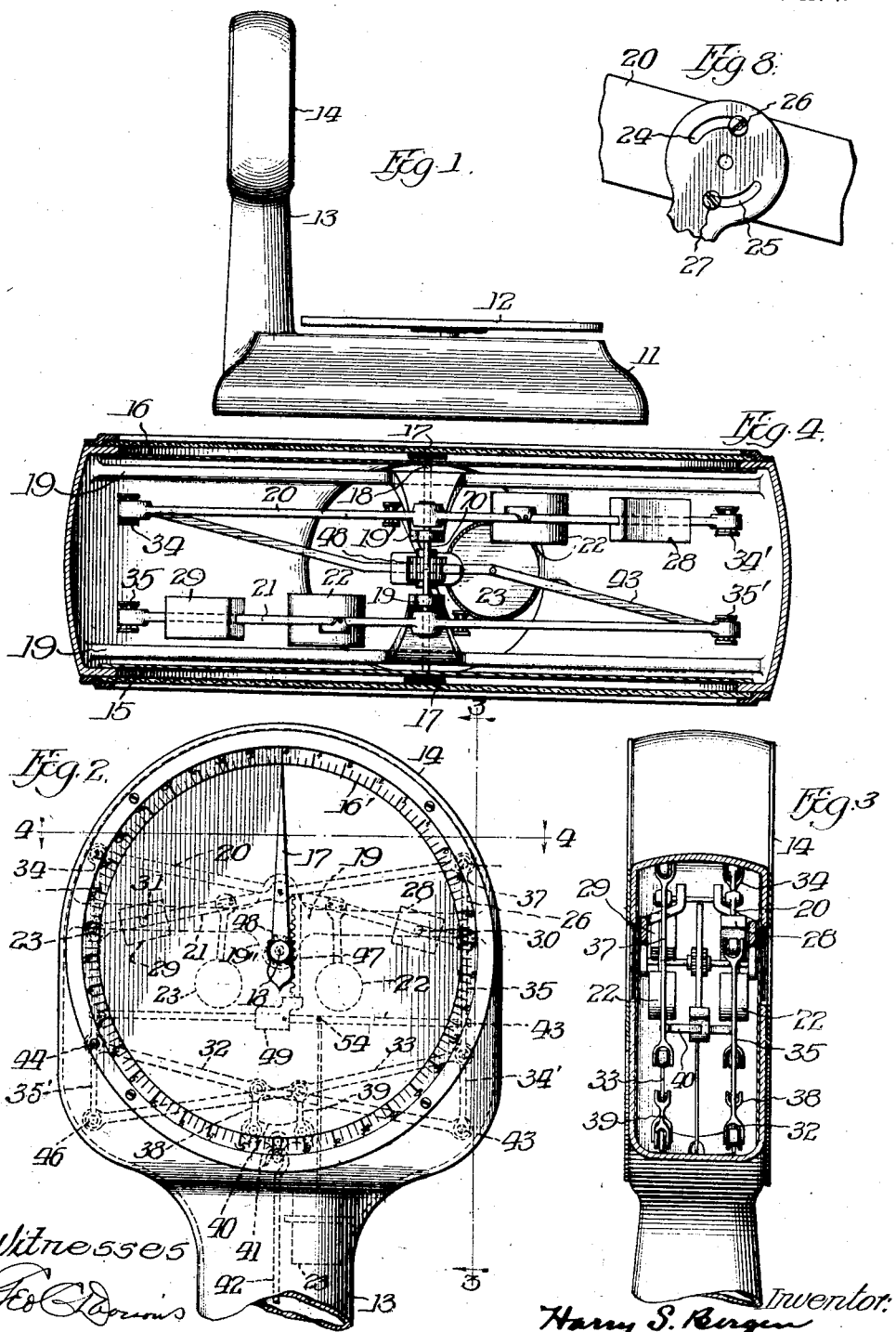

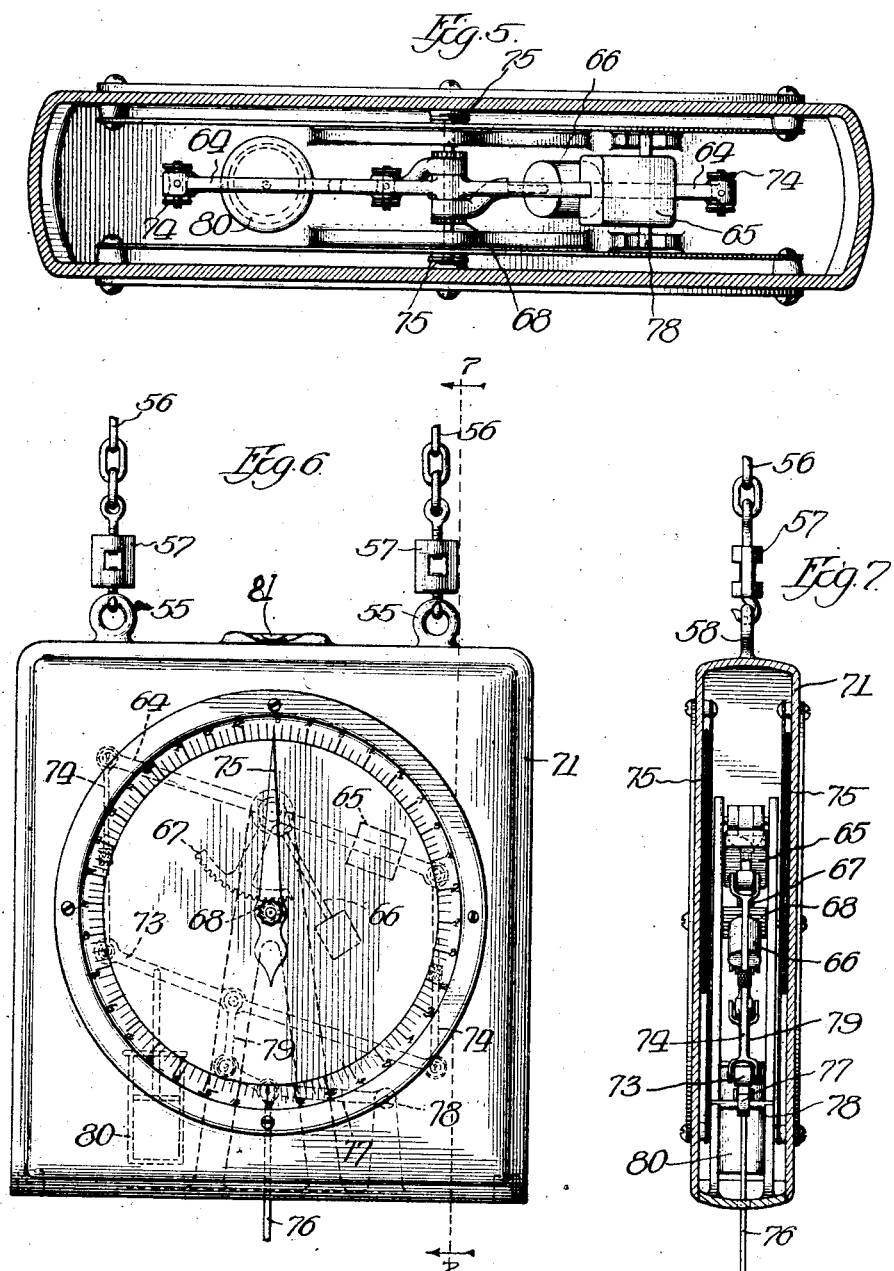

HARRY S. BERGEN, OF TOLEDO, OHIO, ASSIGNOR TO TOLEDO SCALE COMPANY, OF JERSEY CITY, NEW JERSEY, A CORPORATION OF NEW JERSEY.

WEIGHING-SCALE.

1,305,992.   Specification of Letters Patent.   Patented June 10, 1919.

Application filed October 6, 1913. Serial No. 793,653.

*To all whom it may concern:*

Be it known that I, HARRY S. BERGEN, a citizen of the United States, residing at Toledo, in the county of Lucas and State of Ohio, have invented certain new and useful Improvements in Weighing-Scales, of which the following is a specification.

My invention relates more particularly to automatic scales and concerns the load-offsetting and weight-indicating means thereof, being applicable in its broader aspect to such scales whether of the spring or pendulum type. In the accompanying drawings and in the following detailed description, I have disclosed two preferred forms of the invention in which pendulums are used as the load-offsetting means, but it is to be understood that the specific disclosure is for the purpose of exemplification only and that the scope of the invention is set forth in the following claims, in which I have endeavored to distinguish it from the prior art so far as known to me without, however, relinquishing any portion of the invention.

In the accompanying drawings—Figure 1 is a side elevation of a platform scale embodying my invention; Fig. 2, a front view of the weight indicating means, the interior parts being shown in dotted lines; Fig. 3, a vertical, transverse section in the plane of the line 3—3 of Fig. 2; Fig. 4, a horizontal section, on the line 4—4 of Fig. 2; Fig. 5, a horizontal section, similar to Fig. 4, but of a modified form of the invention; Fig. 6, a face view of the indicator mechanism of the second form of the invention; and Fig. 7 a transverse section on the line 7—7 of Fig. 6; Fig. 8 is an enlarged detail elevation showing the upper portion of a pendulum and a portion of one of the levers.

The same reference symbol is applied to each part wherever it occurs throughout the several views.

Referring first to that form of the invention shown in Figs. 1 to 4 inclusive, the base 11 of the scale is cast integral with an upright column 13 at one end thereof supporting a casing 14 which contains the load-offsetting and counter-balancing mechanism to be presently described. The platform 12 and the connection therefrom to the load-offsetting and indicating means may be of any usual or preferred form, it being sufficient for the present purpose to note that the link or hook-rod 42 extends upwardly therefrom within the column and connects to the load-offsetting means within the casing (see Fig. 2.) The casing is cast with circular openings covered by glass panes and disclosing dials 15—16. Within the casing and on opposite sides thereof a pair of supporting bars 19—19 are formed integral with the walls of the casing and provided near their centers with upwardly and downwardly extending pairs of lugs which I have marked 19′ and 19″ respectively. In the lower pair of ears is journaled a shaft 18 which carries at its outer ends the indicator hands 17, 17 which coöperate with the dials referred to above and a pinion 48 is likewise mounted upon this shaft and about centrally thereof and is engaged by means to be presently described for the purpose of rotating the hand and indicating the weight of the load which is upon the platform. The upper lugs 19′ are perforated in register with each other and support an arbor 70 which extends beyond said lugs at its opposite ends and has loosely mounted thereon a pair of levers 20, 21 which are thus capable of independent rotation about said arbor. These levers are identical in construction, and a description of one will serve also for the other. Lever 20 is formed with eyes at its opposite ends in which are pivoted links 34, 34′ of equal length which support at their lower ends a cross-bar 32. (See dotted lines Fig. 2). Similarly the lever 21 has suspended from its opposite ends a pair of links 35, 35′ supporting a cross-bar 33. Somewhat to one side of the center of the casing the bar 32 supports a link 38 and the bar 33 supports a similar link 39 at an equal distance upon the other side of the center of the structure, the two links being joined or connected by an equalizer bar or yoke 40. The link 42 from the platform supporting levers of the scale is connected to said equalizer bar substantially at its middle point, as shown in Fig. 2.

The levers 20, 21 each carry a pendulum 22, 23, which is pivoted thereto, as shown more clearly in Fig. 8, and adjustable angularly with relation thereto by means of the curved slots 24, 25 in the heads of said pendulums and the screws 26, 27 threaded into the levers and which may be tightened to hold the pendulums rigid with respect to their levers when the proper adjustment has been attained. Each lever, by reason of this construction, acts as an automatic load-offsetting means for the scale, and is also furnished with an adjustable poise 28, 29 for sealing the scale, which may be locked in adjusted position by a set screw 30, 31.

The indicator hand 17 above referred to is operated by a rack 47 meshing with a pinion 48 thereon, and the rack bar is attached to a casting 49 pivoted to an equalizer bar 43 and overweighted upon the side opposite to the rack-rod to hold the latter yieldingly in engagement with the pinion 48. As shown in Figs. 2 and 4 the equalizer bar 43 extends diagonally across the casing and is connected at its opposite ends by pin and slot connections to links 34' and 35' depending from the levers 20, 21 respectively. Thus the equalizer bar remains substantially horizontal but moves up and down under the influence of the load upon the scale pan or platform. A dashpot 23 connected to the equalizer bar 43 at 54 prevents undue movement of the parts.

It will now be evident that a load imposed upon the platform 12 drawing down upon the link 42 will swing the levers 20, 21 against the influence of their pendulums and raise the latter substantially proportionally to said load thereby raising the equalizer bar 43 through the medium of the links and causing the rack bar to revolve the hands to indicate the weight of said load.

The form of scale shown in Figs. 5 to 7 inclusive, is somewhat simpler than that just described. I have here shown the invention as applied to a hanging scale, the casing 71 being suspended by ears 55, turnbuckles 57 and chains 56 from the ceiling or other suitable support in the shop of the user. A single lever 64 is employed in this form of the device and suspends a parallel bar 73 by links 74, 74 from its opposite ends. The lever 64 is provided with a sealing weight 65 similar to those described in connection with the other form of scale, and a pendulum 66 which, as shown, is secured to the journal of said lever. A rack sector 67 is also secured to the lever concentric with its pivot or fulcrum and serves to operate the indicating hand 75 by engaging the pinion 68. The link 76 which connects the load-receiving pan of the scale to the load-offsetting means is pivoted to a lever 77 fulcrumed at 78 to fixed posts in the casing and connected at its opposite end by a link 79 with the suspended bar 73 above described. A dashpot 80 connected to bar 73 prevents undue vibration of the scale, and a spirit level 81 is provided for leveling the casing in connection with turn buckles 57.

A number of advantages to which some reference has been already made result from the construction described, but we desire to call particular attention to the fact that by adopting the suspended parallel bar the connection to the platform or scale pan may be placed as near as desired to the plane through the fulcrum of the main lever or levers of the scale whereby the ratio of the effective arms of the latter may be as great or as little as desired.

I claim:

1. In a weighing scale and in combination with the load-receiver and indicating means thereof, a lever, connections from the lever to the indicating means for operating the latter, a cross-bar suspended from the lever and connected thereto at opposite sides of its fulcrum and a connection from the cross-bar at one side of the center thereof to the load-receiver.

2. In a weighing scale and in combination with the goods-receiver and indicator thereof, a lever, connections from the lever to the indicating means for operating the latter, a pair of links suspended therefrom on opposite sides of its fulcrum, a cross-bar connected to the links and connections from said cross-bar at one side of the center thereof to the load-receiver.

3. In a weighing scale and in combination with a weight-indicator and load-receiver, a lever, connections from the lever to the indicating means for operating the latter, a pendulum secured to the lever, a cross-bar suspended from the lever on opposite sides of its fulcrum and substantially parallel thereto and a connection from the cross-bar at one side of the center thereof to the load-receiver.

4. In a weighing scale and in combination with the load-receiver and indicator thereof, a lever, connections from the lever to the indicating means for operating the latter, a pair of links connected to the lever on opposite sides of its fulcrum, a cross-bar connected to the links, a link connected to the cross-bar intermediate of its ends and to one side of the center thereof, and a connection from said link to the load-receiver.

5. In a weighing scale and in combination with the load-receiver thereof, a pair of levers, a cross-bar suspended from the opposite arms of each of said levers and connections from eccentric points of said cross-bars to the load-receiver.

6. In a weighing scale and in combination with the load-receiver thereof, a pair of levers, a pair of links suspended from the opposite ends of each lever, a cross-bar suspended from each pair of links and connections from eccentric points of the cross-bars to the load-receiver.

7. In a weighing scale and in combination with the load-receiver thereof, a pair of levers, a cross-bar suspended from each lever and connected thereto at opposite sides of its fulcrum, an equalizer suspended from eccentric points of said cross-bars and a connection from the equalizer to the load-receiver.

8. In a weighing scale and in combination with the load-receiver thereof, a pair of levers, a pair of links connected to each lever upon opposite sides of the center thereof, a cross-bar carried by each pair of links, an equalizer bar connected at its opposite ends to eccentric points of the respective cross-bars and a connection from an intermediate point of said equalizer to the load-receiver.

9. In a weighing scale and in combination with the load-receiver thereof, a pair of levers, a load-offsetting means connected to each lever, a cross-bar suspended from each lever on opposite sides of its fulcrum and substantially parallel thereto, an equalizer, a link connecting one end of the equalizer with an eccentric point of one of the cross-bars, a second link connecting the other end of the equalizer with the other of the cross-bars and a connection from the load-receiver to an intermediate point of the equalizer.

10. In a weighing scale and in combination with the load-receiver thereof, a pair of levers, a pendulum attached to each lever, a cross-bar suspended upon each lever on opposite sides of its fulcrum, an equalizer bar, a link connecting each end of the equalizer with an eccentric point of one of the cross-bars and a connection from the equalizer to the load-receiver.

11. In a weighing scale and in combination with the weight-indicator and load-receiver thereof, a pair of levers; load-offsetting means connected to the levers, an equalizer bar, links connecting the ends of the equalizer bar with the respective levers upon opposite sides of their fulcrums and a driving connection between said equalizer bar and the weight-indicator mechanism.

12. In a weighing scale and in combination with the load-receiver and weight-indicator thereof, a pair of levers each pivoted intermediate its ends and in substantial axial alinement with the pivot of the other, load-offsetting means connected to each of the levers, a pair of links pivoted to the opposite ends of each of the levers, a cross-bar supported by each pair of links, an equalizer connected at its opposite ends to eccentric points of the respective cross-bars, a connection from the equalizer to the load-receiver, an equalizer-bar connected to one of the levers on one side of their axes and to the other lever on the other side of their axes and driving connections between said equalizer-bar and the weight-indicator.

13. In a weighing scale and in combination with the load-receiver thereof, a pair of levers, a pair of crossbars suspended respectively from each of said levers, a link depending from each crossbar and connected with the crossbars at other than their central points, an equalizer connecting the links, and connections from said equalizer to the load-receiver.

14. In a weighing scale and in combination with the load-receiver thereof, a pair of levers pivoted intermediate their ends and provided with load-offsetting means, and means for connecting the load-receiver to the levers whereby it will rock said levers in opposite directions upon imposition of a load thereon, said means including a pair of crossbars arranged substantially parallel to said levers, substantially parallel links connecting the opposite ends of said levers to said crossbars, and connections from the load-receiver to eccentric points of the crossbars.

15. In a weighing scale and in combination with the load-receiver thereof, a pair of levers pivoted intermediate their ends, load-offsetting pendulums carried by said levers, and means for connecting the load receiver to the levers whereby it will rock said levers in opposite directions upon imposition of a load thereon, said means including a pair of crossbars arranged substantially parallel to said levers, parallel links connecting the opposite ends of said levers to said crossbars, a pair of links secured one to each of said crossbars and arranged on opposite sides of the centers of said crossbars, an equalizer connecting the links, and connections from the load-receiver to the equalizer.

16. In a weighing scale and in combination with the load-receiver thereof, a pair of levers, a pair of links extending from each lever on opposite sides of its fulcrum, crossbars connecting each pair of links, connections from eccentric points of the crossbars to the load-receiver, an equalizer bar connected to the link extending from one of said levers on one side of its fulcrum and to the link extending from the other of said levers on the opposite side of its fulcrum, and weight-indicating means operated upon movement of the equalizer bar.

17. In a weighing scale and in combination with the load-receiver thereof, a pair of levers, a pendulum adjustably secured on each lever, a pair of links extending from each lever on opposite sides of its fulcrum, crossbars connecting each pair of links, connections from eccentric points of the crossbars to the load-receiver, an equalizer bar connected to the link extending from one of said levers on one side of its fulcrum and to the link extending from the other of said levers on the opposite side of its fulcrum, and weight-indicating means operated upon movement of the equalizer bar.

HARRY S. BERGEN.

Witnesses:
CLARENCE W. FESSENDEN,
F. A. CROWLEY.

Copies of this patent may be obtained for five cents each, by addressing the "Commissioner of Patents, Washington, D. C."